May 5, 1936.　　　　C. F. OBERMAIER　　　　2,039,977
INSULATION
Filed March 23, 1932　　　　2 Sheets-Sheet 1
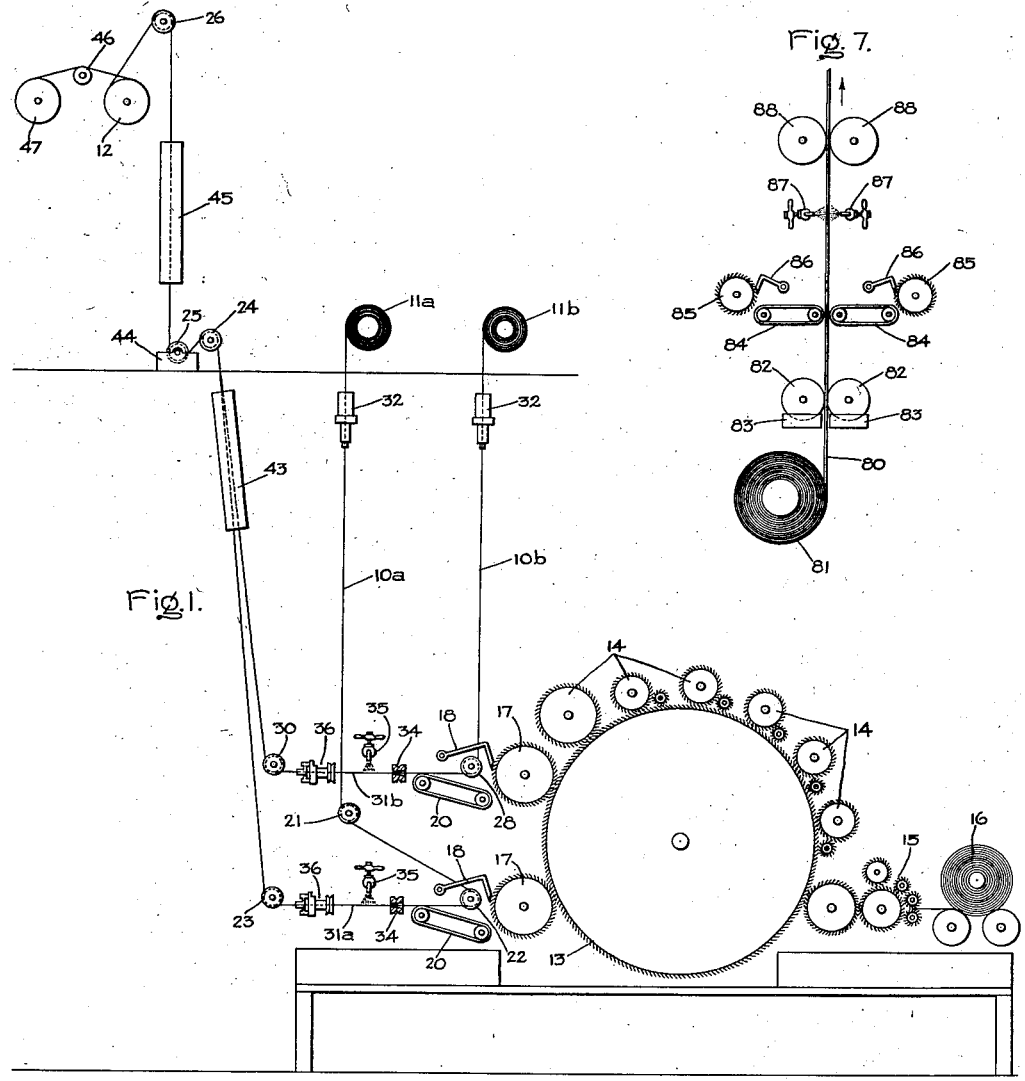
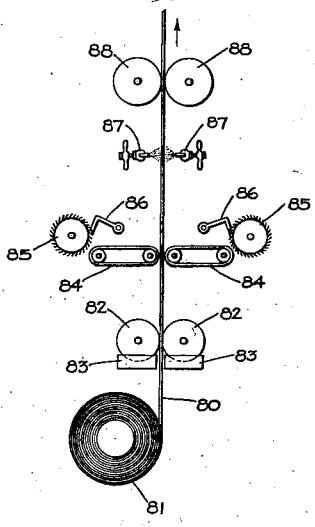
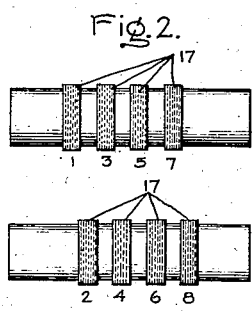
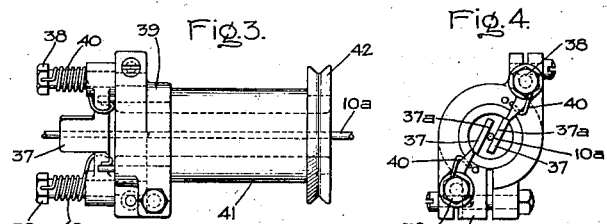
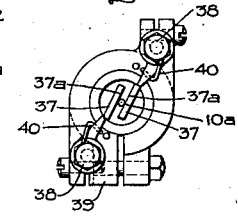
Inventor:
Carl F. Obermaier,
by His Attorney.

May 5, 1936.  C. F. OBERMAIER  2,039,977
INSULATION
Filed March 23, 1932  2 Sheets-Sheet 2
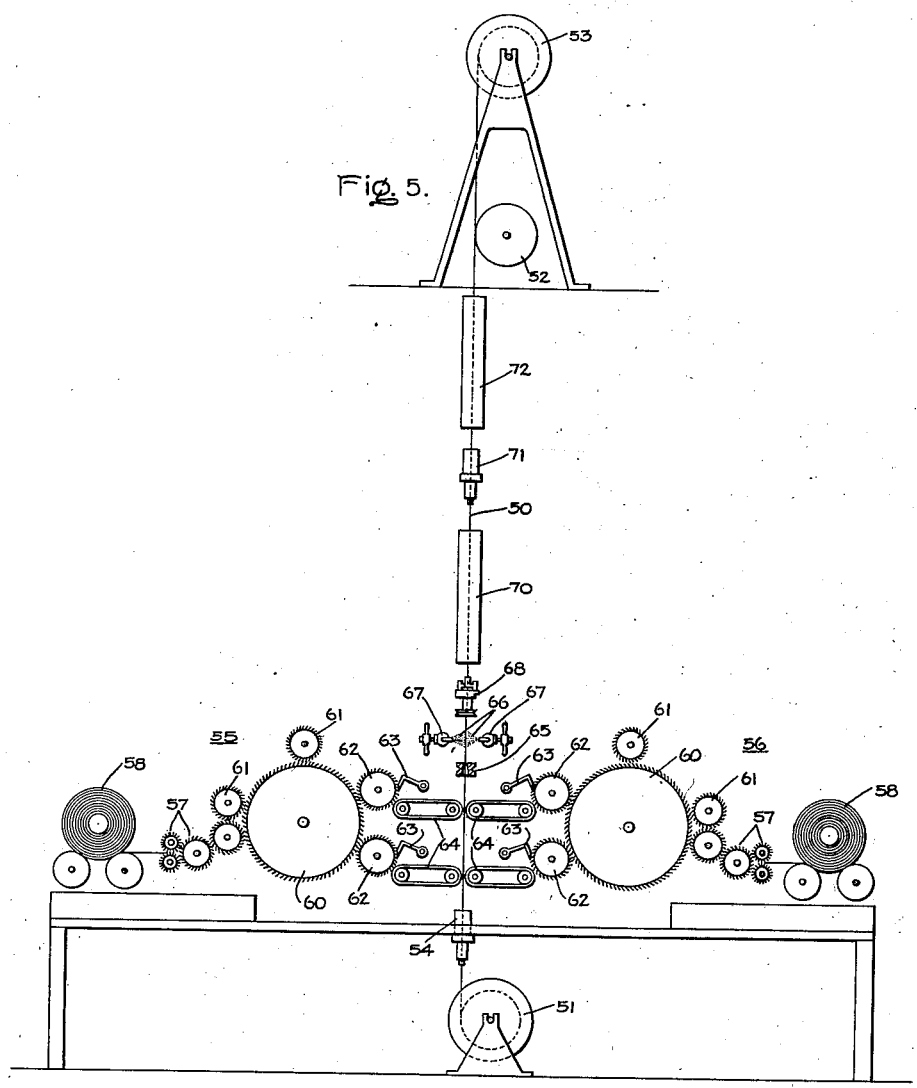
Inventor:
Carl F. Obermaier,
by Charles E. Tullar
His Attorney.

Patented May 5, 1936

2,039,977

UNITED STATES PATENT OFFICE 2,039,977

INSULATION

Carl F. Obermaier, York, Pa., assignor to General Electric Company, a corporation of New York Application March 23, 1932, Serial No. 600,648

21 Claims. (Cl. 173—244)

My invention relates to insulation, and has for its object the provision of an improved method and means for insulating electrical conductors and the like.

More specifically, my invention contemplates the provision of improved method and means for applying an insulating coating of fibrous material, such as asbestos, to electrical conductors, insulating tapes and sheets, etc.

In accordance with my invention, I coat the conductor or other member to be covered with a suitable adhesive and then apply the insulating fibres to the conductor so as to be secured thereto by the adhesive. I prefer to apply the fibres to the conductor in a flocculent condition and with the fibres separated and arranged in parallelism with each other and with the conductor. Raw asbestos fibres may be suitably prepared for application to the conductor by means of a carding machine.

When insulating an electrical conductor, I compress the fibres after they have thus been applied, and fold them spirally so that they practically surround all portions of the conductor and are fitted closely to it. These operations may be conveniently effected by advancing the conductor with the fibres attached through a suitable rotating die arranged to compress the fibres and as it rotates to fold them spirally about the conductor.

After this operation I subject the fibres to a condensing influence so as to distribute them indiscriminately around and about the conductor, thereby producing a felt-like mass of asbestos tightly packed about all portions of the conductor. This step, in accordance with my invention, is accomplished by bringing the fibres into contact with a fluid condensing medium. I have found that steam, water vapor or a finely atomized water will suitably felt or mat the asbestos fibres.

After the fibres have thus been matted or felted, I brush the fibres so as to provide a hard polished surface and to bring the insulated conductor to the desired gauge.

Preferably, after this polishing step, the insulated conductor will be heated or baked so as to remove the moisture absorbed by the fibres during the condensing operation.

Thereafter, the insulated conductor may be treated in any suitable manner. Thus, for example, the fibres may be impregnated with a suitable insulating varnish, such as lacquer.

For a more complete understanding of my invention, reference should be had to the accompanying drawings in which Fig. 1 illustrates diagrammatically apparatus for insulating electrical conductors arranged in accordance with my invention; Fig. 2 is a plan view of certain elements of the mechanism shown in Fig. 1; Fig. 3 is an enlarged elevation of a portion of the mechanism of Fig. 1; Fig. 4 is an end view of the mechanism shown in Fig. 3; Fig. 5 is a diagrammatic view illustrating another form of mechanism used to insulate an electrical conductor arranged in accordance with my invention; Fig. 6 is a plan view of certain portions of the mechanism shown in Fig. 5; and Fig. 7 is a diagrammatic view illustrating a portion of the mechanism of Figs. 5 and 6 as utilized to apply insulating covering to insulating tapes, sheets, and the like.

Referring more specifically to Figs. 1–4, inclusive, I have shown my invention in connection with means for applying asbestos fibres to electrical conductors. As shown, the conductors 10a and 10b are drawn from suitable supply spools 11a and 11b by means of a suitable capstan 12. Interposed between the supply spools 11a and 11b and the capstan 12 are idler pulleys arranged, as will be pointed out in greater detail hereinafter, to cause the conductors passed through the apparatus to take certain predetermined directions.

The asbestos fibres which are to be applied to the conductors passed through the apparatus are treated by means of a suitable carding machine so as to produce a fine fleece of flocculent material, the fibres being separated, and arranged in substantially parallel relation with respect to each other.

This carding device is provided with a carding drum 13, a number of worker rolls and fancies 14 associated therewith, and with feed rolls 15. The raw asbestos fibres, preferably mounted on a suitable supply spool 16, are fed to the carding device by means of the feed rolls 15, and, as is well understood, are worked by the worker rolls and fancies so that they are cleaned and combed and separated and arranged in substantially parallel relationship with each other. The fibres thus treated are picked from the carding cylinder 13 by means of doffer rings 17. The carded asbestos fibres are stripped from the doffer rings by means of suitable vibratory combs 18, one comb being associated with each of the doffer rings.

Each doffer ring and vibratory comb set 17, 18 serves to provide asbestos for one conductor 10a, 10b. While I have shown but two electrical conductors fed through the apparatus, it will be understood that a number of conductors will be insulated at the same time. In the particular apparatus disclosed in Figs. 1 and 2, it is contemplated that eight conductors will be simultaneously fed through the apparatus. Consequently eight doffer rings and combs will be provided.

Referring to Figs. 1 and 2, it will be observed that these ring doffers 17 are arranged on two levels of four each. Counting from left to right in Fig. 2, the uneven numbered rings 1, 3, 5 and 7 are arranged on the upper level, whereas the even numbered rings 2, 4, 6 and 8 are arranged on the lower level. In other words, succeeding ring doffers 17 are arranged on different levels, and the ring doffers on each level are spaced apart a distance slightly less than the width of the doffer ring. As shown in Fig. 2, the doffer rings on the lower level are arranged so as to lie vertically beneath the spaces provided between the doffer rings of the upper level. This, in effect, provides a series of doffer rings engaging a continuous length of surface of the carding cylinder 13, each doffer ring, as has been pointed out, accommodating one conductor, that is, each doffer ring functioning to take off the necessary asbestos from the cylinder 13 to insulate one conductor. Preferably, for medium sized conductors, the doffer rings 17 will be so arranged that they will take substantially a 2" width of asbestos fibres from the carding cylinder 13. By arranging the succeeding doffer rings on different levels, as has just been described, I am enabled to insulate the conductors without any possible interference with each other.

The asbestos fibres which have been carded and stripped from the carding machine by the doffer rings 17 and combs 18 are ready for application to the conductors 10a, 10b, etc. These fibres are picked up by suitable endless conveyors 20 and are conveyed in streams from the doffer rings to points of application to the conductors.

While I have shown but two conveyors 20, namely those for the conductors 10a and 10b, it will be understood that a conveyor will be provided for each conductor, i. e., for each ring doffer.

The conductors are advanced in such directions relative to the streams of asbestos carried by the conveyors 20 that as the conductors advance they will be brought into contact with the streams of asbestos. As shown, the conductor 10a is directed from the supply spool 11a over an idler pulley 21 and over idler pulleys 22 and 23 and thence over idler pulleys 24, 25 and 26 to the capstan 12, while the conductor 10b is directed over idler pulleys 28 and 30 and thence over the idler pulleys 24, 25 and 26 to the capstan 12. It will be observed that the idler pulleys 21, 22 and 23 provided for the conductor 10a and the idler pulleys 28 and 30 provided for the conductor 10b are so arranged that portions 31a and 31b of the conductor lengths are caused to travel horizontally through the mechanism in parallel relation with each other. Moreover, as shown (Fig. 1), the conveyors 20 are arranged at angles with respect to the lengths 31a, 31b so that as the conductors advance these lengths will be substantially tangent to a curved portion of their respective endless conveyors 20. In other words, the paths through which the conductor portions 31a, 31b are passed are substantially tangent to a curved portion of the paths of the asbestos fibres from the carding machine.

Each conductor 10a, 10b when leaving its supply spool 11a, 11b is coated with a suitable adhesive so that when the conductor is advanced to its point of tangency with the endless conveyor 20 the adhesive will function to pick up the stream of asbestos fibres which are carried by the conveyor and advance the asbestos stream along with the conductor. It will be observed that the streams of fibres thus picked up will be applied to one side of the advancing conductors.

For the purpose of applying the adhesive to the conductors, I have provided suitable adhesive pots or receptacles 32 through which the conductors are passed and arranged to coat the conductors as they travel through them. Any suitable adhesive solution, such as shellack, synthetic resin varnishes, resin, gum solutions, etc., may be used.

The angular relationship existing between the paths through which the conductors and asbestos fibre streams are advanced is an important feature of my invention in that the conductor comes in contact with the asbestos streams at but a single point. It is unnecessary for the conductors to touch the conveyor 20 at any time; it is merely necessary to bring the conductors sufficiently close to the conveyors to allow the adhesive to be brought into contact with the stream of asbestos fibres carried by the conveyors. If instead of thus arranging the conductors and conveyors 20, the conductors were advanced along the carrying surfaces of the conveyors parallel with them and supported by them, as in devices heretofore generally used, it is quite likely that the conveyors 20 would have to be provided with some suitable armor so as to prevent the conductors from wearing grooves into their carrying surfaces. This, of course, would add to the complexity and expense of construction of the conveyors. In my apparatus the conductor wire at no time comes into actual contact with the conveyor and hence any possibility of the conductors injuring the conveyors or of the conveyors injuring the conductors, or insulation has been eliminated. The conveyors in my apparatus merely function to support and advance the asbestos streams.

In addition, my arrangement of applying the asbestos at substantially a single point is of advantage in that the fibre streams are uniformly applied to the conductors in a flocculent condition, i. e., in the condition they are delivered by the carding machine.

As has been pointed out, the conductors 10a, 10b in passing from the supply spools 11a, 11b will be provided with a coating of adhesive and then will be advanced in such directions that the adhesive will function to pick up the streams of fibres carried on the conveyor belts 20, whereby as the conductors advance, these streams of fibres will be carried along with them.

From the conveyor belts 20 the conductors pass through suitable dies 34. These dies serve to compress the asbestos fibres and to fold the fibres, which have been applied along one side of the conductors, spirally around and about the conductors. As shown, the dies 34 are provided with axially arranged conical apertures through which the conductors are passed, the apertures tapering inwardly in the direction of motion of the conductors. These dies will be rotated so that the asbestos not only will be compressed upon the conductors as they pass through the dies, but also will be folded spirally around them. This step brings the insulated conductor approximately to the gauge required.

Then I subject the fibres, which have thus been compressed and folded, to a condensing medium so as to distribute the fibres indiscriminately all around and about the conductor, thereby producing a felt-like coating of insulating material.

For this purpose I subject the fibres to a fluid condensing medium, such as a spray of water, finely atomized, or water vapor or steam. I have found that by subjecting the asbestos fibres to either of these fluid condensing mediums they will be caused to be distributed indiscriminately about the conductor. Thus, they will be caused to assume a felt-like mass of insulating material around and about all portions of the conductor passed through the fluid medium. The spiral or folded positions which have been given the fibres by the rotating dies 34 will have disappeared and the felted fibres will be found to completely envelope the electrical conductors. This fluid condensing medium may be applied in any suitable manner. As shown, I have illustrated valve-controlled fluid conduits 35 arranged above the horizontal paths 31a and 31b of the conductors so that the fluid issuing from the conduits will be directed on to the fibres as they are passed beneath them. It will be understood of course that any suitable means may be utilized for bringing the vaporous or fluid medium into contact with the asbestos fibres.

After the fibres have thus been condensed, I brush or otherwise polish the fibres so as to bring the insulated conductors to the required gauge and to provide a smooth and unbroken exterior surface.

For this purpose I provide rotary mechanical brushes 36. These rotary brushes 36 are shown in detail in Figs. 3 and 4. For the purpose of illustration, I have taken the rotary brush 36 used in connection with the conductor 10a, it being understood that all of the brushes are identical. As shown, the polisher comprises a pair of polishing shoes or blocks 37 having opposed polishing surfaces 37a. The shoes 37 are pivotally mounted on studs 38 provided for them on a suitable rotatably mounted supporting body or collar 39. The studs 38 also function to support suitable tension springs 40 which are arranged to bias the polishing surfaces 37a toward each other. The body 39 is provided with a bearing seat or journal 41 which will be received in any suitable bearing (not shown), and is further provided with a pulley 42 adapted to receive a belt or other suitable mechanical driving member. It will be observed that the polisher 36 is so arranged that the conductor 10a will pass through it axially between the polishing shoes 37 which by reason of the springs 40 apply considerable pressure to the asbestos fibres. As the conductor is advanced through the polisher and as the polisher itself is rotated on its axis all portions of the asbestos will be subjected to the polishing action.

After the fibres have thus been polished, the conductors are passed through a suitable heating or baking chamber 43, the function of which is to evaporate any of the condensing medium which has been absorbed and retained by the fibres.

After the asbestos covering has thus been dried it is generally desirable to impregnate the fibres with a suitable electrically insulating varnish, such as lacquer. For this purpose, the conductors as they are advanced from the oven 43 are directed through a suitable bath 44 of the insulating varnish by means of the idler pulleys 24 and 25.

From the bath 44 the conductors are passed through a second heater 45 which serves to dry the insulating varnish, and from this heater they are passed, over the idler pulley 26 which directs them to the capstan 12. From the capstan the conductors are directed over an idler pulley 43 and then received on suitable spools 47.

It will be understood that the capstan 12 which functions to draw or pull the conductors 10a, 10b, etc., through the apparatus will be rotated at a speed bearing a predetermined ratio with the speed at which the streams of fibres are delivered by the conveyor belts 20 from the carding machine so that the conductors will be advanced at just the right speed to pick up the advancing streams of asbestos and carry them along with it. In other words, the speed imparted to the conductors will bear a definite ratio with the speed of delivery of the carded fibres from the machine.

By thus controlling the speed of the conductors through the apparatus and the speed at which the asbestos fibres are brought from the carding machine and further, by controlling the weight of raw asbestos fed into the carding machine, it is possible to accurately control the thickness of asbestos covering, i. e. pounds per thousand feet of asbestos applied to the conductors.

It will be understood, of course, that the mechanical connections between capstan 12 and the carding machine will provide for an even rate of movement of the conductors through the machine so that each unit length of each conductor will receive substantially the same thickness of insulation.

When insulating conductors of relatively large diameter, or when insulating square and rectangular conductors, and the like, I find it advisable to apply the asbestos fibres to different portions of the conductor as it is passed through the apparatus. Thus, for example, the fibres may be applied simultaneously to opposite sides of the conductor as it is passed through the apparatus, rather than to one side only, as shown in Fig. 1.

For this purpose, I provide the apparatus with a pair of opposed carding machines (see Figs. 5 and 6). In this apparatus, the conductors 50 to be treated are passed from supply spools 51 vertically upwardly between the carding machines. The conductors are advanced by means of a capstan 52 and then delivered to receiving spools 53.

As before, each conductor in being passed through the mechanism is covered with an adhesive which preferably will be applied by passing the conductor through a suitable receptacle 54 which contains the adhesive and operates to apply it to the surfaces of the conductor as it is passed through.

The carding means of this apparatus comprises opposed machines 55 and 56; each of these machines comprises feeding members 57 which serve to feed the asbestos from a supply roll 58 and deliver it to the carding means proper. The carding means of each machine comprises a carding cylinder 60, worker and fancy rolls 61, and doffer rings 62. The doffer rings 62 provided for each machine are arranged on two levels in identically the same manner as are the doffer rings of the machine shown in Figs. 1 and 2. And moreover, the corresponding rings 62 of the machines are arranged directly opposite each other.

The asbestos fibres are picked off these doffer rings by means of suitable vibrating combs 63 and the fibres thus picked off are laid on endless conveyors 64. The conveyors 64 of the opposed doffer rings are themselves opposed and are arranged substantially horizontally. The aligned conveyors of the two machines are spaced apart somewhat so as to allow the conductor 50 to pass freely up between them.

It will be observed that in this case also the conductors 50 are advanced along paths substantially tangent to a curved portion of the endless conveyors 64 which carry the asbestos fibres from the carding machines.

As the conductors 50 advance upwardly from the adhesive receptacles 54 between the opposed conveying belts 64 the asbestos fibres on these belts are applied to opposite sides of the conductors and caused to adhere thereto by the adhesive coating.

From the conveying belts 64, each conductor passes through a revolving mechanical die 65 which compresses the fibres and folds them spirally around and about all portions of the conductor.

Thence the conductor is passed through a suitable condensing medium which, as before, may be steam or water vapor, or highly sub-divided water particles 66 directed against the fibres, as by means of suitable opposed conduits 67. This condensing medium, as has been pointed out, causes the fibres to be distributed indiscriminately around and about the conductor.

After being subjected to the condensing medium, the conductor is passed through a polishing device 68 similar in construction to the polishing device 36 of Fig. 1 and performing the same functions as does this device; and then the conductor is directed through a heater 70 for the purpose of evaporating moisture which has been absorbed by the fibres during the condensing process.

Thereafter the conductors may, if desired, be treated, as were the conductors of Fig. 1, by impregnating them with a suitable insulating varnish, such as lacquer. For this purpose each conductor is passed through a suitable receptacle 71 which receives the varnish and which serves to apply it to the conductor as the conductor is passed through the receptacle.

Thence the conductors are passed through a second heater 72 to completely dry the impregnating compound, and from this heater are passed through the capstan 52 to the receiving spool 53.

My method and apparatus may also be utilized to apply asbestos fibres to tapes or sheets of material, such for example, as sheets of cellulosic material, to make an electrically insulating sheet, such as described and claimed in my copending application Serial No. 576,433, filed November 20, 1931. As there described, this insulation comprises a combination of a sheet of cellulosic material and asbestos fibres coating the sheet.

Referring to Fig. 7 I have illustrated diagrammatically my apparatus for applying asbestos fibres to a sheet of material 80 of the above-mentioned character. The sheet of material 80 is passed vertically upwardly from a suitable supply spool 81 and as it is advanced has its opposite sides coated with a suitable adhesive. The adhesive may be applied by means of opposed rolls 82 engaging the sheet and having their surfaces coated by dipping in adhesive baths 83.

After the adhesive has thus been applied the sheet 80 is directed between a pair of opposed conveyors 84 which convey streams of carded asbestos fibres from the doffer rings 85 of suitable carding machines (not shown) arranged on opposite sides of the path of travel of the material, as shown in Fig. 5.

In this instance it is only necessary to use one doffer ring 85 and associated stripper 86, and only one conveyor belt 84. The belts and rings will have a length somewhat greater than is the width of the sheet 80 being treated.

As shown, the sheet 80 is directed substantially tangentially to the curved portions of the opposed conveyor belts 84, and as it is thus directed will pick up the streams of asbestos fibres delivered by these belts and then will advance through the mechanism with the fibres attached to its opposite sides.

These fibres, which are arranged on opposite sides of the sheet in substantially parallel relation with each other and with the direction of travel of the sheet, are distributed indiscriminately over the surface of the sheet by means of a fluid condensing medium. As in the previous cases, this medium may be water vapor or steam, or may be highly atomized water particles. Opposed valved conduits 87 are provided for directing streams of the condensing fluid over the opposite surfaces of the asbestos covered sheet.

Then the sheet, together with the distributed asbestos fibres, is passed upwardly through opposed pressing rolls 88 which not only serve to compress the fibres, but also may be heated so as to evaporate any moisture which is absorbed by the fibres during the condensing process.

It is to be understood that my method and apparatus may be used to apply other materials, such as cotton, jute, and the like to conductors, tapes, and sheets, etc.

While I have shown particular embodiments of my invention, it will be understood of course that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. The method of applying fibrous material to a conductor and the like which comprises applying the fibres of said material to said conductor, and then subjecting said fibres to the influence of a liquid which has been transformed substantially to the vaporous condition so as to distribute said fibres indiscriminately over the surface of said conductor.

2. The method of applying a fibrous material to a member which consists in applying an adhesive to said member, separating the fibres of said material and arranging the fibres thus separated in substantially parallel relation with each other, then applying said fibres to said member so as to be secured thereto by said adhesive, then causing said member to pass through a rotating conical die so as to fold said fibres spirally about said member and then subjecting said fibres to the influence of a liquid condensing medium which has been transformed substantially to the vaporous condition so as to arrange said fibres indiscriminately on said member.

3. The method of providing a filamentary and like member with a fibrous covering which comprises applying an adhesive to said filamentary member and then applying the fibrous material in flocculent form to one side of said member so that said material is caused to adhere to said member by the adhesive which is applied thereto, then folding said fibres spirally about said member so that they surround and cover all portions of said member, and then subjecting said fibres thus applied to water finely atomized whereby the fibres are indiscriminately distributed around and about said member in a felt-like mass.

4. The method of insulating an electrical conductor and the like which comprises advancing said conductor and as it advances applying an adhesive thereto, arranging the fibres of a fibrous insulating material in substantially parallel relation with each other and advancing said fibres in a stream in such a direction that said stream of fibres is picked up by the adhesive on said conductor and advanced with it, and then subjecting the fibres carried by said conductor to a vaporous medium so as to distribute said fibres indiscriminately around and about said conductor.

5. The method of applying asbestos fibres and the like to an electrical conductor and like members which comprises advancing said conductor and as it advances applying an adhesive thereto, arranging the asbestos fibres in substantially parallel relation with each other and causing said fibres thus arranged to advance in a stream, directing said stream in such a direction that said fibres are picked up by the adhesive on said conductor and advanced with it, then subjecting said fibres as they advance to a fluid condensing medium which has been transformed substantially to the vaporous condition so as to distribute said fibres indiscriminately around and about said conductor, then applying a pressure to said fibres so as to lay them close against said conductor and thereafter heating said conductor so as to evaporate the condensing medium absorbed by said fibres.

6. The method of applying asbestos fibres and the like to an electrical conductor and like members which comprises advancing said conductor and as it advances applying an adhesive thereto, arranging asbestos fibres in substantially parallel relation with each other and causing said fibres thus arranged to advance in a stream, directing said stream in such a direction that said fibres are picked up by the adhesive on one side of said conductor and advanced with it, then applying a pressure to said fibres so as to lay them closely against said conductor and so as to cause them to assume a spiral position on said conductor, subjecting said fibres as they advance with said conductor to a vaporous condensing medium so as to distribute said fibres indiscriminately around and about said conductor to form a felted mass, then polishing the surfaces of said insulated conductor and thereafter heating said conductor to evaporate the fluid condensing medium absorbed by said fibres.

7. The method of applying fibrous material to a member which consists in coating said member with an adhesive, advancing streams of the fibres of said material in opposite directions to opposite sides of said member and applying said fibres to said opposite sides, folding said fibres about said member and then subjecting said fibres to a fluid vaporous condensing influence so that they are distributed indiscriminately over the surface of said member in a felt-like mass.

8. The method of insulating an electrical conductor which consists in advancing said conductor and as it advances covering it with an adhesive, arranging the raw fibres of an insulating material in parallel relation with each other and causing said fibres thus arranged to advance in a stream, directing said advancing stream so that said fibres are picked up by the adhesive on said conductor and said stream is advanced with said conductor, causing said conductor with said fibres attached thereto to pass through a die to compress said fibres and rotating said die so as to fold said fibres spirally about and around said conductor as it compresses them, passing water vapor over said conductor as it advances so as to distribute said fibres indiscriminately about said conductor in a felt-like mass, brushing said fibres so as to lay them smoothly against said conductor and so as to gauge said conductor, heating said fibres so as to evaporate any condensing fluid absorbed by said fibres and then impregnating said fibres with a liquid insulating material.

9. The method of applying a fibrous material to a filamentary member and the like which consists in advancing said member in a predetermined direction, covering said member with an adhesive as it advances, advancing fibres of sa d material along a curved path of motion arranged in the plane of movement of said member so that the path of motion of said member is substantially tangent to said curved portion of said path of motion whereby said member contacts said path of fibres at but a single point where said fibres are brought in contact with said adhesive and picked up thereby and advanced with said filamentary member and then subjecting said fibres to a vaporous condensing medium.

10. Apparatus for applying fibrous material to a member comprising means for applying an adhesive to said member, means for receiving and carding said fibrous material, an endless conveyor for receiving the carded fibres from said carding means and for conveying them in a free stream from said carding means through a curved path of motion and means for advancing said member on a path lying in the plane of movement of said endless conveyor and substantially tangent to said curved portion of said path so that said member contacts said stream of fibres only at said curved portion where the carded fibres carried by said conveyor are picked up from said conveyor by the adhesive on said member.

11. Apparatus for applying fibrous material and the like to a continuous filamentary member and the like comprising means for covering said member with an adhesive, means for carding the fibres of said material, a conveyor having substantially parallel advancing and returning portions and a curved portion uniting said parallel portions for receiving the fibres directly from said carding means and for conveying said fibres in a free stream on said advancing portion from said carding means and means for advancing said filamentary member along a path in the plane of the path of said stream of fibres arranged at a substantial angle to said parallel portions and having a portion contiguous with said curved portion of said conveyor so that said member contacts said stream of fibres at but a single point where the adhesive on said member picks up said stream from said conveyor and advances it with said member.

12. Apparatus for insulating an electrical conductor comprising means for receiving fibrous insulating material and separating and straightening the fibres of said material so that they are arranged substantially parallel to each other, an endless conveyor arranged to receive said fibres directly from said carding means and for advancing them in a free stream through a curved path, means for advancing said conductor along a path arranged in the plane of movement of said endless conveyor on an angle to said conveyor substantially tangent to said curved path so that said conductor contacts said free stream of fibres on said conveyor at but a single point, means for applying an adhesive to said conductor whereby as said conductor is advanced tangent to said conveyor, the fibres are caused to adhere to said conductor and thereby removed from said conveyor, means for compressing and turning said fibres spirally about said conductor and means for distributing them indiscriminately around and about said conductor.

13. Means for applying fibrous material to a filamentary member and the like comprising a conveyor for feeding a free stream of the fibres of said material along a curved path of motion and means for feeding said filamentary member along a path in the plane of motion of said fibres and substantially tangent to said curved path so that said member contacts said free stream of fibres only at said curved portion where the fibres carried by said conveyor are applied to said filamentary member.

14. Apparatus for insulating an electrical conductor and the like comprising means for applying fibrous insulating material to said conductor and means for subjecting said fibres thus applied to a fluid condensing medium substantially in the vaporous condition so as to distribute said fibres indiscriminately around and about said conductor.

15. Means for applying asbestos fibres and the like to an electrical conductor comprising means for applying said fibres to said conductor in substantially parallel relation with each other and with said conductor, a revolving conical die engaging said conductor to fold said fibres spirally about the same and means for applying a vaporous condensing medium to said fibres so as to distribute said fibres indiscriminately around and about said conductor in a felted mass.

16. An apparatus for insulating an electrical conductor comprising means for advancing said conductor continuously along a predetermined path, means for covering said conductor with an adhesive as it advances, means for arranging asbestos fibres in substantially parallel relation with each other and for applying them thus arranged to said conductor, means for compressing said fibres and arranging them spirally about said conductor, means for subjecting said fibres to water vapor so that they are distributed indiscriminately about said conductor in a felt-like mass and members arranged to apply a force to said fibres and to smooth and polish them to provide a hard, smooth finish for said insulated conductor.

17. Apparatus for covering an electrical conductor with a fibrous insulating material comprising a supply spool for receiving said conductor, means for advancing said conductor continuously from said supply spool, means for covering said conductor as it advances with an adhesive, a carding machine arranged to receive said fibrous insulating material and deliver it with the fibres of the material arranged in substantially parallel relation with each other, a conveyor for carrying the carded fibres from said machine in a stream and for bringing said stream into contact with said adhesive covered conductor whereby the stream of fibres advanced on said conveyor are picked up by said conductor and carried with it as it is advanced, a die through which said conductor is passed arranged to compress said fibres, means for rotating said die so that said fibres are arranged spirally around and about said conductor, means for subjecting said fibres to a vaporous or fluid medium so that they are indiscriminately distributed around and about said conductor in felt-like form, brushes for engaging said fibres to compress and polish them, heating means for evaporating the vaporous condensing medium absorbed by said fibres and means for impregnating said fibres with an electrically insulating compound.

18. Apparatus for covering a member with a fibrous insulating material comprising means for coating said member with an adhesive, means for separating the fibres of said material and arranging them in substantially parallel relation with each other, means for advancing said separated and parallel fibres to said member in streams flowing in different directions and for applying the fibres of said streams to different portions of said member and means for subjecting said fibres to a vaporous condensing medium so as to distribute them indiscriminately over the surfaces of said member so as to produce a felt-like insulating covering.

19. Apparatus for covering an electrical conductor and the like with a fibrous insulating material comprising means for advancing said conductor and as it advances covering it with an adhesive, means for advancing streams of the fibres of said material toward said conductor from different directions so that they are picked up by the adhesive covering said conductor, means for folding said fibres spirally around and about said conductor as it advances and means for subjecting said fibres to a water vapor medium so that said fibres are arranged indiscriminately around and about said conductor to produce a felt-like insulated covering.

20. Apparatus for applying fibrous material to conductors and the like comprising a carding device for separating the fibres of said material including a carding drum, a plurality of doffer rings arranged in rows at different levels operably associated with said drum to pick the fibres from said drum, the rings at each level being positioned at spaced intervals and the spaces between the rings of one level being positioned opposite the rings of another level, means for advancing a plurality of conductors in paths opposite the doffer rings of each level and means for stripping the fibres from said rings and for applying them to said conductors.

21. Apparatus for applying fibrous material to conductors and the like comprising a pair of opposed carding devices, each having a carding drum and a plurality of doffer rings arranged in two rows at different levels operably associated with its drum so as to pick the fibres from said drum, the rings at each level of each carding device being positioned at spaced intervals and opposite the spaces of the other level and opposite the corresponding rings of the other device, means for advancing a plurality of conductors in paths opposite the respective opposed rings of each level, and opposed conveyors opposite each pair of corresponding rings and on opposite sides of the corresponding conductor arranged to carry fibres from said opposed rings to opposite sides of said conductor.

CARL F. OBERMAIER.